(12) United States Patent
Sakata (10) Patent No.: US 9,726,246 B2
(45) Date of Patent: Aug. 8, 2017

(54) ANTIVIBRATION DEVICE

(71) Applicant: TOYO TIRE & RUBBER CO., LTD., Osaka-shi, Osaka (JP)

(72) Inventor: Toshifumi Sakata, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 0 days.

(21) Appl. No.: 14/200,287

(22) Filed: Mar. 7, 2014

(65) Prior Publication Data

US 2014/0284858 A1    Sep. 25, 2014

(30) Foreign Application Priority Data

Mar. 20, 2013    (JP) .................................. 2013-057421

(51) Int. Cl.
*F16F 15/08*    (2006.01)
*F16F 1/38*    (2006.01)

(52) U.S. Cl.
CPC .................................. *F16F 1/3849* (2013.01)

(58) Field of Classification Search
CPC .......... F16F 15/08; F16F 1/3849; F16F 1/371; B60K 5/1241; B60K 5/1208; B69G 11/22
USPC ......................................................... 267/292
See application file for complete search history.

(56) References Cited

U.S. PATENT DOCUMENTS

| 4,240,517 | A | * | 12/1980 | Harlow, Jr. | ........ B60G 21/0551 180/295 |
| 4,610,420 | A | * | 9/1986 | Fukushima | ........... F16F 13/262 180/300 |
| 4,685,531 | A | * | 8/1987 | Kopich | ................ B60K 5/1283 180/300 |
| 4,697,795 | A | * | 10/1987 | West | ..................... F16F 13/149 267/140.12 |

(Continued)

FOREIGN PATENT DOCUMENTS

JP          63149442 A  *  6/1988  .............. F16F 13/14
JP       2005-291448 A     10/2005

(Continued)

OTHER PUBLICATIONS

European Search Report dated Aug. 6, 2014, Issued in corresponding European Application No. 14159662.7-1755. (7 pages).

(Continued)

*Primary Examiner* — Xuan Lan Nguyen
(74) *Attorney, Agent, or Firm* — Westerman, Hattori, Daniels & Adrian, LLP (57)    ABSTRACT

[Problem to be Solved]
To provide an antivibration device that can realize low dynamic spring characteristics in a high vibration region while securing a damping force in a low vibration region.
[Solution]
In the case where a load input in the axial direction of a coupling member is a predetermined value or smaller, the dynamic spring constant of a first bush 10 is set larger than that of a second bush 20, and the loss factor of the second (Continued)

bush 20 is set larger than that of the first bush 10. On the other hand, in the case where the load input in the axial direction of the coupling member 30 exceeds the predetermined value, the dynamic spring constant of the first bush 10 is set smaller than that of the second bush 20.

5 Claims, 10 Drawing Sheets

(56) References Cited

U.S. PATENT DOCUMENTS

| | | | | |
|---|---|---|---|---|
| 5,190,269 A * | 3/1993 | Ikeda | ............ | F16F 1/387 267/140.12 |
| 5,273,261 A * | 12/1993 | Hamberg | ............ | F16F 13/14 180/312 |
| 6,199,840 B1 * | 3/2001 | Yano | ............ | F16F 13/14 267/140.12 |
| 2004/0060789 A1 * | 4/2004 | Hamada | ............ | B62D 1/10 188/373 |
| 2005/0206057 A1 * | 9/2005 | Endo | ............ | F16F 1/3849 267/292 |
| 2007/0272051 A1 * | 11/2007 | Kamei | ............ | B60G 7/001 74/579 R |
| 2010/0044938 A1 * | 2/2010 | Kappich | ............ | B60K 5/1241 267/140.12 |

FOREIGN PATENT DOCUMENTS

| | | |
|---|---|---|
| JP | 2006-349068 A | 12/2006 |
| JP | 2008-24267 A | 7/2008 |

OTHER PUBLICATIONS

Office Action dated Aug. 31, 2015, issued in counterpart Chinese Patent Application No. 201410077946.8, w/English translation (11 pages).

* cited by examiner

ANTIVIBRATION DEVICE

TECHNICAL FIELD

The present invention relates to an antivibration device that can realize low dynamic spring characteristics in a high vibration region while securing a damping force in a low vibration region.

BACKGROUND ART

Up to now, there has been known an antivibration device such as a torque rod, a suspension link, or an arm of an automobile that is mounted in a vehicle and that is provided between two members to be coupled for antivibration. The antivibration device controls the relative displacement of two members while suppressing vibration transmission between the two members. As the antivibration device, for example, there is one in which rubber bushes are assembled to the both ends of the longitudinal direction of a rod, and a fluid chamber is formed at, at least, one of the rubber bushes. An equilibrium chamber whose volume is allowed to be changed by configuring a part of a wall portion using a flexible membrane is formed at an intermediate portion of the longitudinal direction of the rod, and is in communication with the fluid chamber through an orifice passage (Patent Literature 1).

According to the technique disclosed in Patent Literature 1, the fluid chamber, the equilibrium chamber, and the orifice passage are filled with an incompressible fluid, and thus the incompressible fluid flows between the equilibrium chamber and the fluid chamber through the orifice passage when vibration is input. In the case where vibration in a low vibration region (low frequency region) of approximately 10 to 20 Hz is input due to the resonant action of the incompressible fluid, a high damping force can be secured.

CITATION LIST

Patent Literature

[Patent Literature 1] Japanese Unexamined Patent Application Publication No. 2005-291448

SUMMARY OF INVENTION

Technical Problem

However, in the case where vibration in a relatively-high vibration region (high frequency region) of 100 Hz or higher is input, deformation of the equilibrium chamber can be easily constrained in the above-described conventional technique. Thus, the following capability becomes low and low dynamic spring characteristics cannot be realized.

The present invention has been made to address the above-described problems, and an object thereof is to provide an antivibration device that can realize low dynamic spring characteristics in a high vibration region while securing a damping force in a low vibration region.

Solution to Problem and Advantageous Effects of Invention

An antivibration device according to claim 1 includes a first bush, a second bush, and a coupling member that couples the first bush and the second bush to each other, and is mounted in a vehicle. In each of the first bush and the second bush, an inner attachment portion is attached to a member on the vehicle side, and an antivibration base that is made of rubber-like elastic material is provided between the outer circumferential side of the inner attachment portion and the coupling member side. In the case where a load input in the axial direction of the coupling member is a predetermined value or smaller, the dynamic spring constant of the first bush is set larger than that of the second bush. Thus, shock-absorbing by the second bush becomes dominant over the input of vibration. In this case, the loss factor of the second bush is set larger than that of the first bush, and thus the damping force of the antivibration device can be secured. The damping force of the antivibration device can be assumed as a viscous damping force proportional to the velocity of vibration, and thus the damping force in a low vibration region can be secured by the second bush.

On the other hand, in the case where the load input in the antivibration device exceeds the predetermined value, the dynamic spring constant of the first bush is set smaller than that of the second bush. In this case, shock-absorbing by the first bush becomes dominant over the input of vibration, and thus low dynamic spring characteristics of the antivibration device can be realized. Accordingly, the low dynamic spring characteristics in a high vibration region can be realized by the first bush. Thus, the low dynamic spring characteristics in the high vibration region can be advantageously realized while securing the damping force in a low vibration region.

According to the antivibration device described in claim 2, the second bush has a hollow portion formed at the antivibration base, and a protruding portion is located inside the hollow portion. The protruding portion protrudes from the inner attachment portion to the direction intersecting with the axial direction of the inner attachment portion, and a viscous fluid is enclosed in the hollow portion. The viscous fluid is agitated by the protruding portion to generate resistance due to relative displacement between the coupling member and the inner attachment portion. Accordingly, the loss factor can be increased in a wide frequency range. As a result, in addition to the effect of claim 1, the loss factor of the second bush can be advantageously secured in a wide frequency range.

According to the antivibration device described in claim 3, the second bush is configured in such a manner that the protruding tip end of the protruding portion can abut on the coupling member side when the load is input. In the case where the input load exceeds the predetermined value, the state in which the protruding tip end of the protruding portion abuts on the coupling member side is maintained. Accordingly, the dynamic spring constant of the second bush can be increased, and thus the dynamic spring constant of the first bush can be relatively made smaller.

On the other hand, in the case where the input load is the predetermined value or smaller, the state in which the protruding tip end of the protruding portion abuts on the coupling member side is released. Thus, the loss factor of the second bush can be increased, and the dynamic spring constant of the second bush can be decreased. As a result, in addition to the effect of claim 2, the low dynamic spring of the antivibration device can be realized by the first bush and the second bush irrespective of the magnitude of the input load. Further, in the case where the input load is the predetermined value or smaller, the loss factor of the antivibration device can be advantageously increased by the second bush.

According to the antivibration device described in claim 4, 5 or 6, the first bush has a gap provided at the antivibration base in a concave manner along the axial direction of the inner attachment portion. The gap is provided in the direction in which the coupling member and the inner attachment portion relatively come close to each other due to the input load. A stopper portion made of elastic material is provided on the side opposite to the gap across the inner attachment portion. In the case where the input load is the predetermined value or smaller, the stopper portion presses the inner attachment portion in a state where the stopper portion is preliminarily compressed in the longitudinal direction of the coupling member.

Accordingly, in addition to the effect of any one of claims 1 to 3, the dynamic spring constant of the first bush in the case where the input load is the predetermined value or smaller can be advantageously increased with a simple structure. Further, if the coupling member and the inner attachment portion relatively come close to each other when the load is input, the pressing force by the stopper portion is decreased in the first bush. Thus, the dynamic spring constant of the first bush can be advantageously decreased. Further, the reliability can be advantageously secured because the structure is simple.

DESCRIPTION OF EMBODIMENTS

Figure 1:
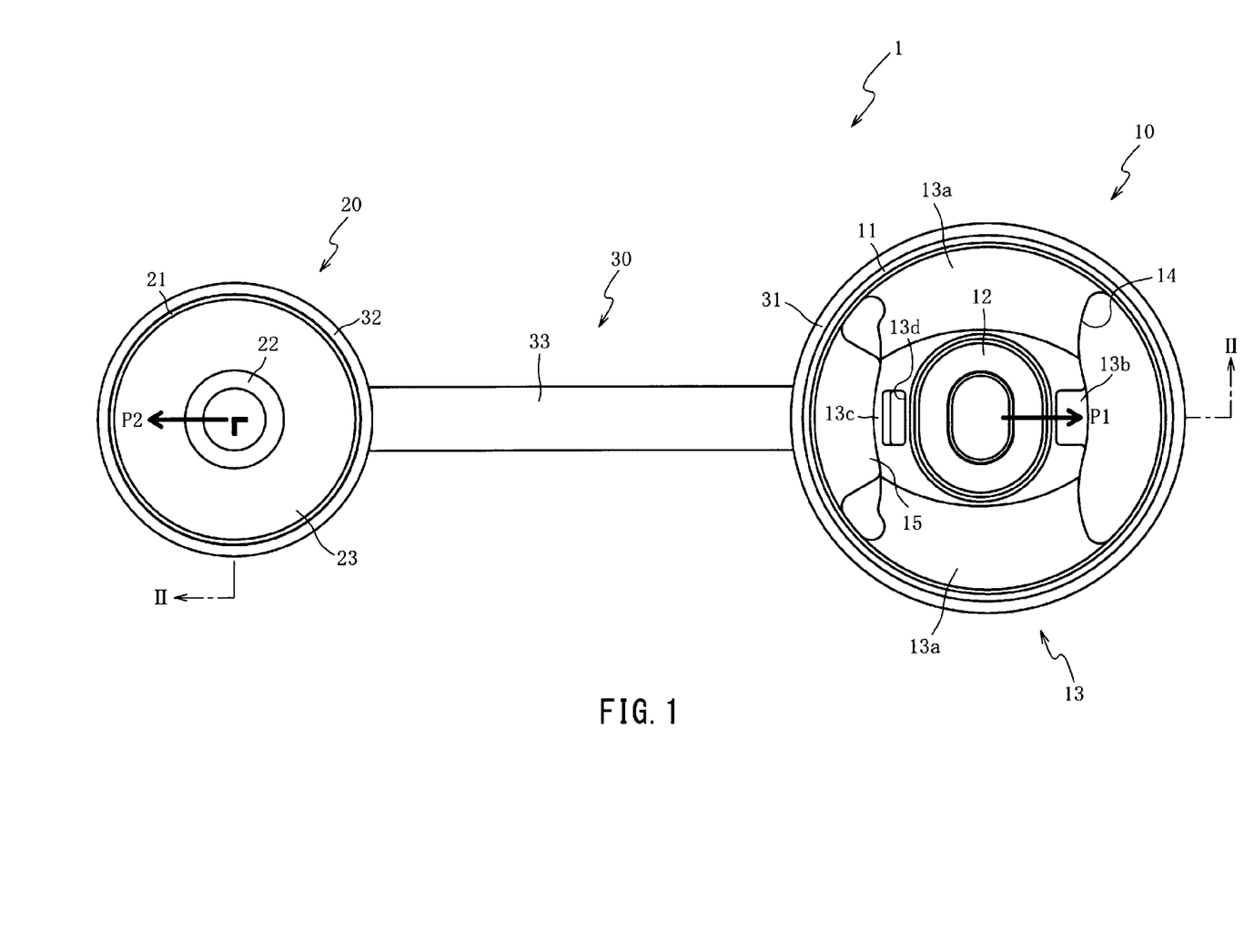
FIG. 1 is a plan view of an antivibration device in a first embodiment of the present invention.

Hereinafter, preferred embodiments of the present invention will be described with reference to the accompanying drawings. First, a first embodiment will be described with reference to FIG. 1 and FIG. 2. FIG. 1 is a plan view of an antivibration device 1 in the first embodiment of the present invention, and FIG. 2 is a cross-sectional view of the antivibration device 1 taken along the line II-II of FIG. 1.

As shown in FIG. 1, the antivibration device 1 includes a first bush 10, a second bush 20, and a coupling member 30 that couples the first bush 10 and the second bush 20 to each other, and is configured to be able to suppress the relative displacement of an engine while suppressing vibration transmission between the engine and a vehicle body. In the embodiment, the first bush 10 is coupled to the engine side (the right side of FIG. 1, not shown), and the second bush 20 is coupled to the vehicle body side (the left side of FIG. 1, not shown).

The first bush 10 includes a cylindrical outer attachment portion 11 to which the coupling member 30 is coupled, an inner attachment portion 12 that is located on the inner circumferential side of the outer attachment portion 11 to be attached to the engine side (not shown), and an antivibration base 13 that is provided between the outer attachment portion 11 and the inner attachment portion 12 and that is made of elastic material (rubber-like elastic material).

Figure 2:
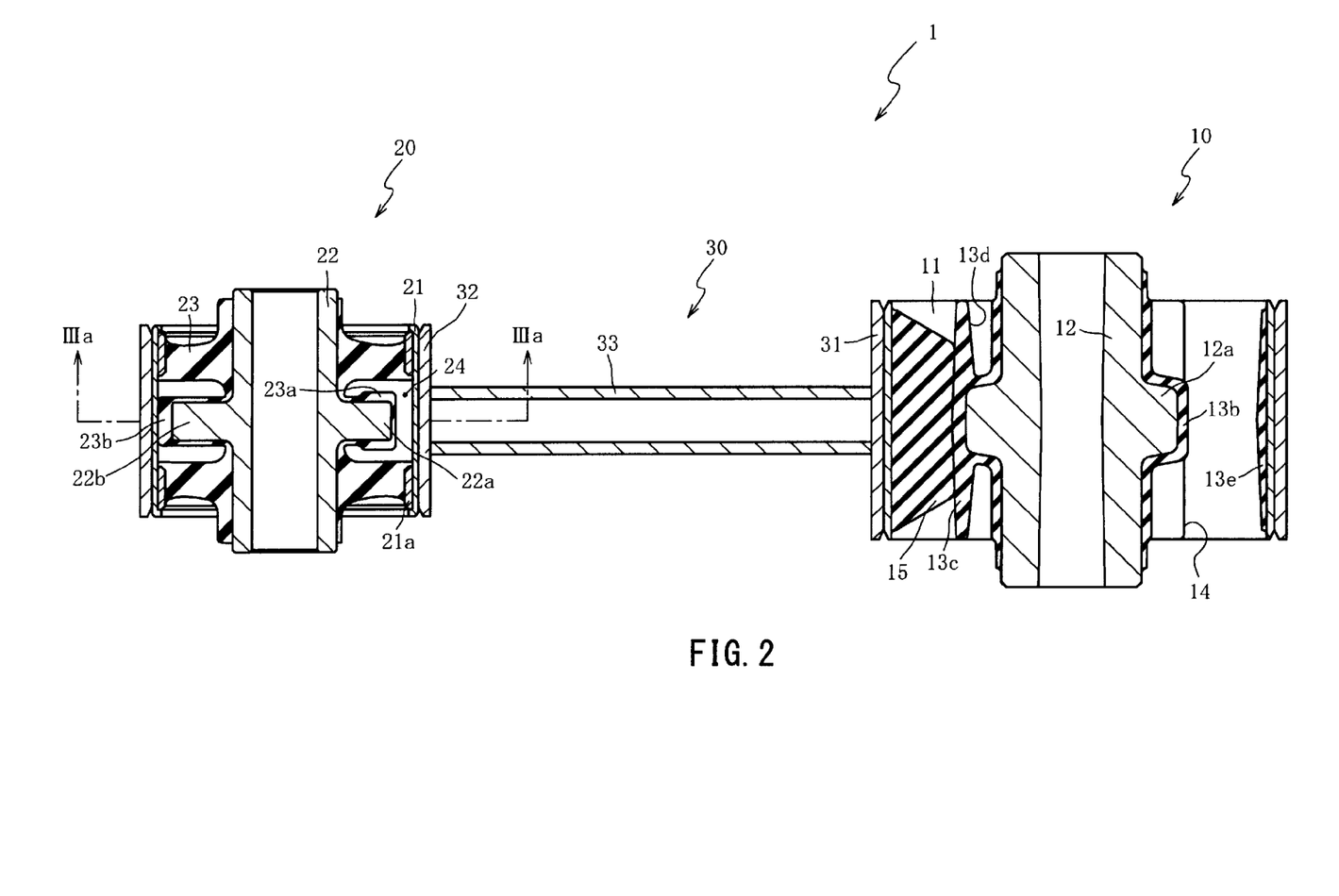
FIG. 2 is a cross-sectional view of the antivibration device taken along the line II-II of FIG. 1.

As shown in FIG. 2, the outer attachment portion 11 is made of steel material and is formed in a cylindrical shape. The inner attachment portion 12 is made of aluminum alloy and is formed in a tubular shape. A convex portion 12a protruding in the radial direction is formed at an intermediate part in the axial direction (the vertical direction of FIG. 2) of the inner attachment portion 12. A bolt (not shown) is inserted into a bolt insertion hole that is formed to penetrate through the middle of the inner attachment portion 12, and is fastened to the engine side, so that the inner attachment portion 12 is coupled to the engine side.

The second bush 20 includes a cylindrical outer attachment portion 21 to which the coupling member 30 is coupled, a tubular inner attachment portion 22 that is located on the inner circumferential side of the outer attachment portion 21 to be attached to the vehicle body side (not shown), and an antivibration base 23 that is provided between the outer attachment portion 21 and the inner attachment portion 22 and that is made of elastic material (rubber-like elastic material). A bolt (not shown) is inserted into a bolt insertion hole that is formed to penetrate through the middle of the inner attachment portion 22, and is fastened to the vehicle body side, so that the second bush 20 is coupled to the vehicle body side through the bolt.

The coupling member 30 includes a first tubular member 31, a second tubular member 32, and a bracket member 33 to the both ends of which the first tubular member 31 and the second tubular member 32 are fixed by welding. The first tubular member 31 and the second tubular member 32 are members into which the outer attachment portion 11 of the first bush 10 and the outer attachment portion 21 of the second bush 20 are fitted and pressed, respectively. The first tubular member 31 and the second tubular member 32 are made of steel material and are formed in a tubular shape. The bracket member 33 is made of steel material and is formed in a cylindrical shape. Outer peripheries of the first tubular member 31 and the second tubular member 32 are fixed to the both ends of the bracket member 33 by welding.

In the embodiment, the antivibration device 1 is mounted in the vehicle so that the first bush 10 and the second bush 20 are disposed on the rear side and on the front side of the vehicle, respectively, and the longitudinal direction of the coupling member 30 (bracket member 33) is disposed along the length direction of the vehicle. As a result, when the vehicle is accelerating, the inner attachment portion 12 of the first bush 10 is moved in the direction of the arrow P1 (see FIG. 1) relative to the outer attachment portion 11 (first tubular member 31) due to the displacement of the engine (not shown) attached to the inner attachment portion 12.

On the other hand, the second bush 20 is coupled to the first bush 10 through the coupling member 30. Thus, when the engine is largely displaced in the main direction (the displacement direction of the engine when the vehicle is accelerating), the inner attachment portion 22 is displaced in the direction of the arrow P2 (see FIG. 1) relative to the outer attachment portion 21 (second tubular member 32).

The antivibration base 13 of the first bush 10 mainly includes a pair of rubber leg portions 13a, a first stopper rubber portion 13b, a second stopper rubber portion 13c, and a rubber membrane portion 13e. The pair of rubber leg portions 13a is a part to couple the outer attachment portion 11 and the inner attachment portion 12 to each other, and one end and the other end thereof are fixed to the inner circumference of the outer attachment portion 11 and the outer circumference of the inner attachment portion 12 by vulcanization adhesion, respectively.

The first stopper rubber portion 13b is a part to serve as a stopper pressed and sandwiched between the outer attachment portion 11 and the inner attachment portion 12 when the engine is largely displaced in the main direction (the displacement direction of the engine when the vehicle is accelerating and the direction in which the inner attachment portion 12 is displaced in the direction of the arrow P1 in FIG. 1 relative to the outer attachment portion 11 (first tubular member 31)). The first stopper rubber portion 13b is fixed to the outer circumferences of the inner attachment portion 12 and the convex portion 12a by vulcanization adhesion between the pair of rubber leg portions 13a that are opposed to each other.

The second stopper rubber portion 13c is a part pressed and sandwiched between the inner attachment portion 12 and a stopper portion 15 (to be described later) in the initial state (when the vehicle stops), and is formed integrally with the first stopper rubber portion 13b by vulcanization. The second stopper rubber portion 13c has a concave portion 13d formed at an end in the axial direction. The concave portion 13d decreases the spring constant of the second stopper rubber portion 13c, and can improve the flexibility of the second stopper rubber portion 13c. As a result, the pressing effect of the inner attachment portion 12 by the stopper portion 15 can be improved.

The rubber membrane portion 13e is a membrane-like part adhering to the inner periphery of the outer attachment portion 11 by vulcanization, and serves as a stopper pressed and sandwiched between the outer attachment portion 11 and the inner attachment portion 12 (first stopper rubber portion 13b) when the engine is largely displaced in the main direction (the direction of the arrow P1).

The first bush 10 has a gap 14 provided at the antivibration base 13 in a concave manner along the axial direction (the direction orthogonal to the paper of FIG. 1) of the outer attachment portion 11 and the inner attachment portion 12. In the embodiment, the gap 14 is formed to penetrate through the first bush 10. The gap 14 is provided in the direction (the direction of the arrow P) where the outer attachment portion 11 and the inner attachment portion 12 relatively come close to each other when the vehicle is accelerating. The stopper portion 15 is provided on the side opposite to (the direction of the arrow P) the gap 14 across the inner attachment portion 12 in the outer attachment portion 11. The stopper portion 15 is made of elastic material (rubber-like elastic material), and presses the inner attachment portion 12 and the outer attachment portion 11 in a state where the stopper portion 15 is preliminarily compressed in the longitudinal direction (the horizontal direction of FIG. 1) of the bracket member 33 between the inner attachment portion 12 and the outer attachment portion 11 in the initial state.

It should be noted that the stopper portion 15 is provided over the axial direction (the vertical direction of FIG. 2) of the tubular outer attachment portion 11. Accordingly, the volume of rubber of the stopper portion 15 can be increased, and thus the pressing force (binding force) of the inner attachment portion 12 by the stopper portion 15 can be increased.

Next, a manufacturing method of the first bush 10 will be described. The first bush 10 is formed in such a manner that the tubular outer attachment portion 11 and inner attachment portion 12 formed in an oval shape in a planar view are prepared and disposed in a forming die (not shown), and the antivibration base 13 and the stopper portion 15 are fixed by vulcanization adhesion. The gap 14 and the stopper portion 15 are disposed on the longer diameter side of the outer attachment portion 11. Next, the inner face of the stopper portion 15 is pressed to the outer periphery of the inner attachment portion 12 while the outline of the outer attachment portion 11 is compressed and the outer diameter of the outer attachment portion 11 is adjusted to the inner diameter of the first tubular member 31. Accordingly, the stopper portion 15 can be preliminarily compressed. Finally, the outer attachment portion 11 is fitted and pressed into the first tubular member 31, and the first bush 10 of the antivibration device 1 can be manufactured. According to the first bush 10 configured as described above, the outer attachment portion 11 and the inner attachment portion 12 are pressed in a state where the stopper portion 15 is preliminarily compressed in the initial state (when the vehicle stops), and thus the dynamic spring constant of the first bush 10 can be set at a large value.

Figure 3A:
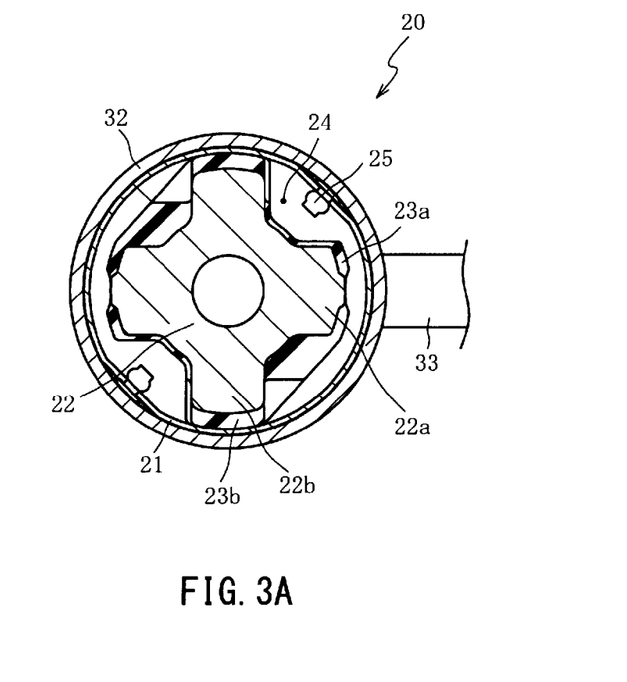
FIG. 3A is a cross-sectional view of a second bush taken along the line IIIa-IIIa of FIG. 2.

Next, a configuration of the second bush 20 will be described in detail with reference to FIG. 2 and FIG. 3A. FIG. 3A is a cross-sectional view of the second bush 20 taken along the line IIIa-IIIa of FIG. 2. As shown in FIG. 2, the second bush 20 mainly includes the tubular outer attachment portion 21, the inner attachment portion 22 that is located on the inner circumferential side of the outer attachment portion 21 and that is formed in a cylindrical shape, and the antivibration base 23 that is fitted between the outer attachment portion 21 and the inner attachment portion 22 and that is made of rubber-like elastic material.

The inner circumferential side of the antivibration base 23 adheres to the outer periphery of the inner attachment portion 22 by vulcanization, and the outer circumference of the antivibration base 23 on the both end sides in the axial direction adheres to the inner peripheries of a pair of inner plates 21a that is formed in a short cylindrical shape by vulcanization. The antivibration base 23 has a circular hollow portion 24 formed over the entire circumference at a middle portion in the axial direction sandwiched between the inner plates 21a. The inner plates 21a are fixed to the outer attachment portion 21 by swaging the both ends of the outer attachment portion 21. Accordingly, the hollow portion 24 is sealed between the antivibration base 23 and the outer attachment portion 21.

The hollow portion 24 is filled with a viscous fluid such as silicon oil. As shown in FIG. 3A, an injection hole for the viscous fluid and an air hole are formed in the outer attachment portion 21. After the hollow portion 24 is filled with the viscous fluid, the injection hole and the air hole are sealed using blind rivets 25. Accordingly, the viscous fluid is enclosed in the hollow portion 24. It should be noted that as the viscous fluid, a fluid having a kinetic viscosity of 1000 cSt to 100000 cSt may be appropriately selected for use.

Protruding portions 22a and 22b extending in the directions orthogonal to the axial direction (the vertical direction of FIG. 2) of the inner attachment portion 22 are formed integrally with the inner attachment portion 22. The protruding portions 22a and 22b are formed in a plate shape, and protrude inside the hollow portion 24 to separate the hollow portion 24 at substantially the half position in the axial direction. The protruding portions 22a and 22b are formed in a substantially-cross shape as a whole in a planar view. The protruding portions 22a are located in the axial direction (the horizontal direction of FIG. 3A) of the bracket member 33 (coupling member 30), and the protruding portions 22b are located in the direction (the vertical direction of FIG. 3A) orthogonal to the axial direction of the bracket member 33. The protruding portions 22a and 22b are provided with stopper rubber portions 23a and 23b that are formed integrally with the antivibration base 23 in a rubber membrane shape by vulcanization. The stopper rubber portions 23a and 23b are parts to restrict excessive displacement of the inner attachment portion 22 and the outer attachment portion 21.

As shown in FIG. 3A, the tip ends of the protruding portions 22a and the stopper rubber portions 23a are closely disposed to the inner periphery of the outer attachment portion 21, and have predetermined intervals relative to the inner periphery of the outer attachment portion 21. Further, the protruding tip ends of the protruding portions 22b and the stopper rubber portions 23b are disposed to come into contact with the inner periphery of the outer attachment portion 21. In the case where the outer attachment portion 21 and the inner attachment portion 22 are displaced relative to the axial direction (the horizontal direction of FIG. 3A) of the bracket member 33, a high damping force can be obtained while the stopper rubber portions 23a do not come into contact with the inner periphery of the outer attachment portion 21 (while the gaps are maintained). At the same time, the dynamic spring constant of the second bracket 20 can be set at a small value. On the contrary, when the stopper rubber portions 23a are pressed into the inner periphery of the outer attachment portion 21, the dynamic spring constant of the second bracket 20 is increased because the thicknesses in the radial direction of the stopper rubber portions 23a covering the protruding portions 22a are small.

According to the second bush 20 configured as described above, when the inner attachment portion 22 and the outer attachment portion 21 are relatively displaced, the viscous fluid in the hollow portion 24 is agitated by the protruding portions 22a and 22b accompanied by the movement of the protruding portions 22a and 22b. As a result, the viscous fluid is moved while passing through the gaps around the protruding portions 22a and 22b. A high damping force is generated with the resistance at this time. The resistance generated at this time has no specific peak relative to the frequency, and thus the damping force can be increased in a wide frequency range.

Further, when the engine is largely displaced in the main direction (the displacement direction of the engine when the vehicle is accelerating), the inner attachment portion 22 of the second bush 20 is displaced in the direction of the arrow P2 relative to the outer attachment portion 21, and the stopper rubber portions 23a are pressed into the inner periphery of the outer attachment portion 21. The dynamic spring constant of the second bracket 20 is drastically increased because the thicknesses in the radial direction of the stopper rubber portions 23a covering the protruding portions 22a are small.

Figure 3B:
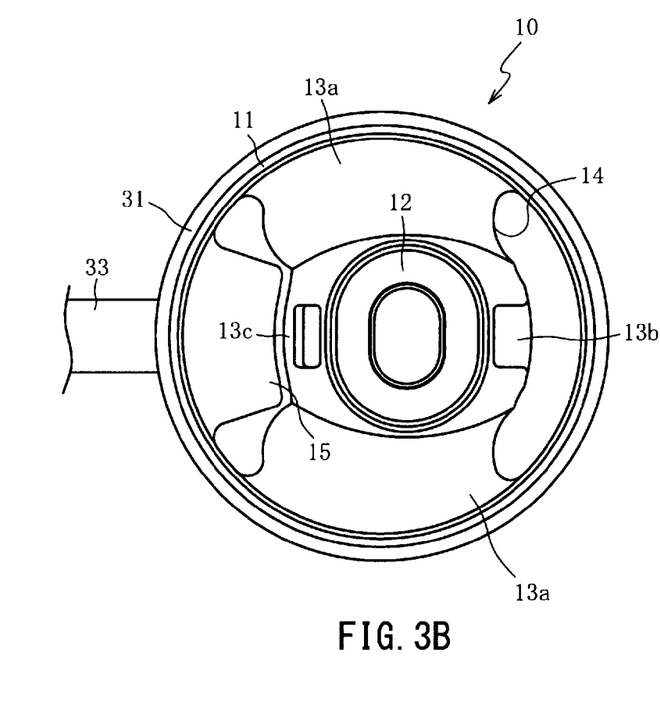
FIG. 3B is a plan view of a first bush when an outer attachment portion and an inner attachment portion relatively come close to each other.

Next, operations of the first bush 10 will be described with reference to FIG. 3B. FIG. 3B is a plan view of the first bush 10 when the outer attachment portion 11 and the inner attachment portion 12 relatively come into contact with each other. As described above, the first bush 10 is provided with the gap 14 in the main direction (the displacement direction of the engine when the vehicle is accelerating) relative to the inner attachment portion 12. The stopper portion 15 is provided on the side opposite to the gap 14 across the inner attachment portion 12 in the outer attachment portion 11. The stopper portion 15 presses the outer attachment portion 11 and the inner attachment portion 12 in a state where the stopper portion 15 is preliminarily compressed in the initial state (when the vehicle stops) (see FIG. 1). As a result, the dynamic spring constant of the first bush 10 can be set at a large value in the initial state.

The engine is largely displaced in the main direction (the right direction of FIG. 3B) when the vehicle is accelerating, and thus the inner attachment portion 12 is relatively displaced in the main direction (the direction of the arrow P1 of FIG. 1) in accordance with the displacement of the engine. As a result, the pressing force by the stopper portion 15 is decreased. Thus, the inner attachment portion 12 is gradually released from the binding by the stopper portion 15, and is elastically supported by the pair of rubber leg portions 13a. As a result, the dynamic spring constant of the first bush 10 can be decreased when the vehicle is accelerating.

Further, the first bush 10 increases the dynamic spring constant in the initial state with a simple structure. In addition, the inner attachment portion 12 is displaced in the main direction (the direction of the arrow P1 of FIG. 1) relative to the outer attachment portion 11, so that the dynamic spring constant is decreased. Thus, the reliability can be secured.

Figure 4:
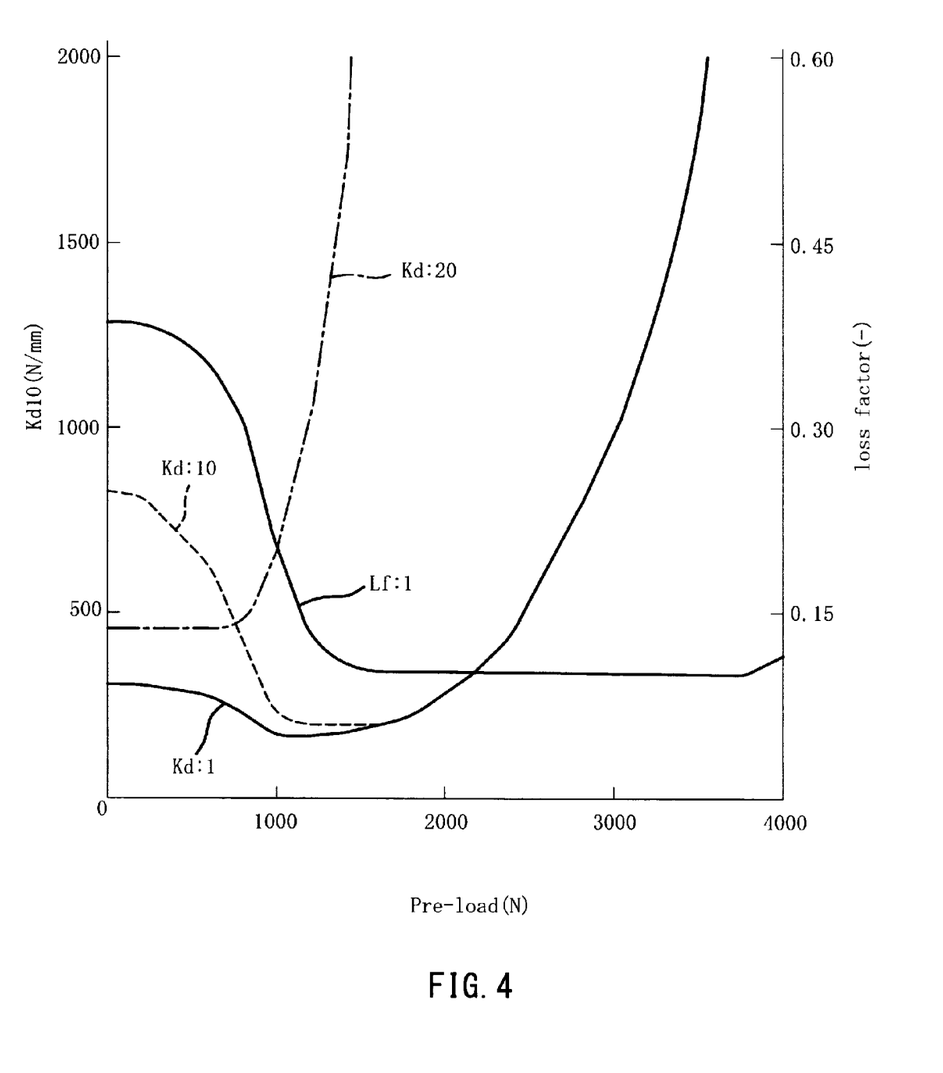
FIG. 4 is a diagram for showing a relation among a preload applied in the axial direction of a coupling member, a dynamic spring constant, and a loss factor at 10 Hz.

Next, a relation between the dynamic spring constant and the loss factor of the antivibration device 1 for a preload when the preload in the axial direction of the coupling member 30 (bracket member 33) is applied to the antivibration device 1 will be described with reference to FIG. 4. FIG. 4 is a diagram for showing a relation among the preload applied to the antivibration device 1, the dynamic spring constant, and the loss factor at 10 Hz.

Figure 5:
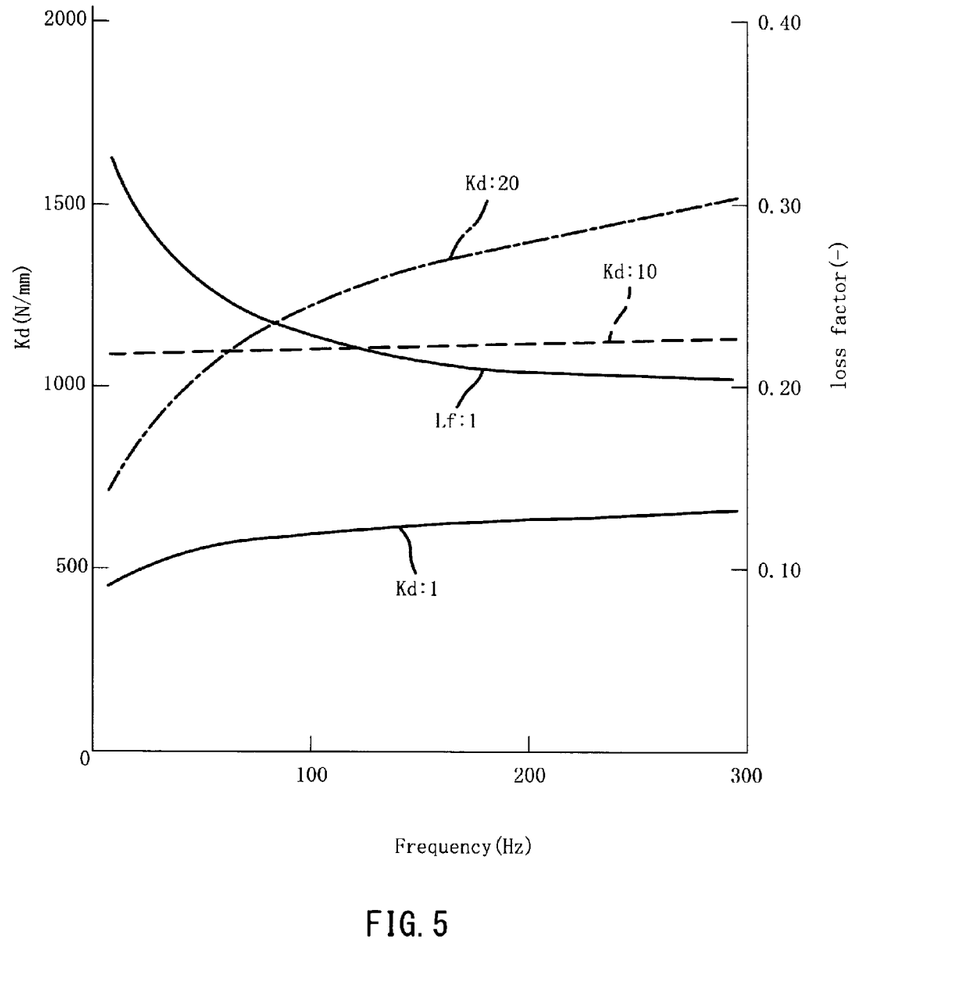
FIG. 5 is a diagram for showing a relation among the frequency of a load input in the antivibration device, the dynamic spring constant, and the loss factor.

It should be noted that Kd:10 represents the dynamic spring constant of the first bush 10, and Kd:20 represents the dynamic spring constant of the second bush 20 in FIG. 4. Further, Kd:1 represents the dynamic spring constant of the antivibration device 1, and Lf:1 represents the loss factor of the antivibration device 1. The reference numerals in the drawing are the same in FIG. 5. Further, the values (the dynamic spring constant, the loss factor, the frequency, and the load) described in FIG. 4 and FIG. 5 are examples, and the present invention is not limited to these values.

Figure 6:
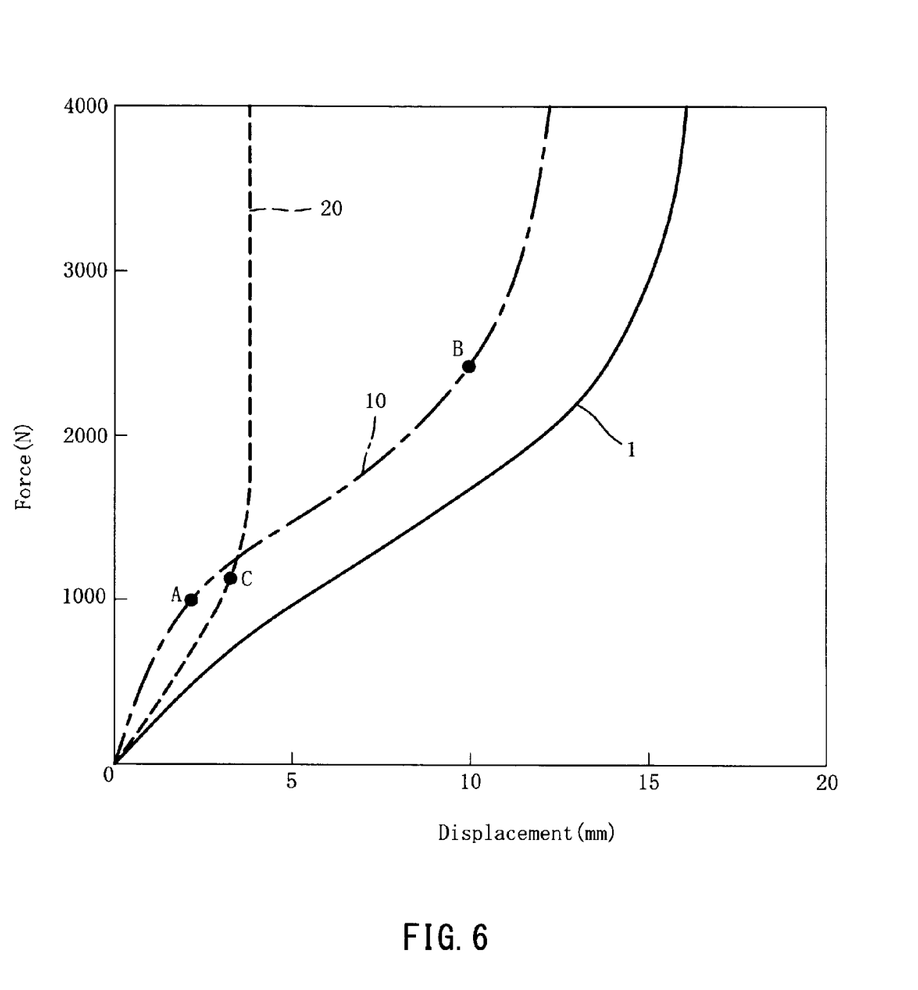
FIG. 6 is a diagram for showing a relation between the load and displacement of the first bush, the second bush, and the antivibration device.

In the case where a load input in the axial direction of the coupling member 30 is a predetermined value (approximately 800N) or smaller (a preload is approximately 800N or smaller) such as when the engine vertically vibrates (oscillates) during the running of the vehicle (running at the constant speed and the like) or during the idling of the engine, the dynamic spring constant (Kd:10) of the first bush 10 is set larger than the dynamic spring constant (Kd:20) of the second bush 20 as shown in FIG. 6. In the embodiment, the antivibration base 13 of the first bush 10 functions as a high dynamic spring by the stopper portion 15 (see FIG. 1).

On the contrary, the dynamic spring constant of the antivibration base 23 of the second bush 20 is set at a small value. As a result, shock-absorbing by the second bush 20 becomes dominant over the input of vibration. The preload applied to the antivibration base 23 is small, and thus the frequency of the antivibration base 23 relative to the input of vibration becomes small. In this case, the loss factor of the second bush 20 by the viscous fluid is set larger than that of the first bush 10 by the antivibration base 13. Accordingly, the loss factor (Lf:1) of the antivibration device 1 in a state where the load input in the axial direction of the coupling member 30 is small can be secured.

In the case where the load input in the axial direction of the coupling member 30 exceeds the predetermined value (approximately 800N) (the preload exceeds approximately 800N) such as when the vehicle is accelerating, the dynamic spring constant (Kd:10) of the first bush 10 is set smaller than the dynamic spring constant (Kd:20) of the second bush 20. In the embodiment, the displacement of the protruding portions 22a (see FIG. 2) and the stopper rubber portions 23a of the second bush 20 is restricted by the outer attachment portion 21, and thus the dynamic spring constant (Kd:20) of the second bush 20 is drastically increased. On the other hand, the inner attachment portion 12 of the first bush 10 is hardly susceptible to interference of the stopper portion 15, and thus the dynamic spring constant (Kd:10) of the first bush 10 is decreased. As a result, shock-absorbing by the first bush 10 becomes dominant over the input of vibration. The preload applied to the antivibration base 13 is large, and thus the frequency of the antivibration base 13 relative to the input of vibration becomes large. Accordingly, the dynamic spring constant (Kd:1) of the antivibration device 1 can be suppressed to be low.

Further, when the load input in the axial direction of the coupling member 30 becomes large (when the preload becomes large), the displacement of the first stopper rubber portion 13b of the first bush 10 is restricted by the outer attachment portion 21. Accordingly, the dynamic spring constant (Kd:10) of the first bush 10 and the dynamic spring constant (Kd:1) of the antivibration device 1 are increased.

Based on the relation among the preload applied to the antivibration device 1 and the dynamic spring constant and the loss factor in each frequency, frequency response characteristics to response vibration can be obtained. FIG. 5 is a diagram for showing a relation among the frequency of a load input in the axial direction of the coupling member 30 of the antivibration device 1, the dynamic spring constant, and the loss factor. As shown in FIG. 5, the dynamic spring constant (Kd:10) of the first bush 10 is less dependent on the frequency, and is substantially constant relative to the frequency. On the contrary, the dynamic spring constant (Kd:20) of the second bush 20 is logarithmically increased as the frequency is increased. Accordingly, the dynamic spring constant (Kd:1) of the antivibration device 1 can be kept substantially constant relative to the frequency. Thus, low dynamic spring characteristics of the antivibration device 1 in a high vibration region (high frequency region) can be secured by the first bush 10. Further, a damping force in a low vibration region can be secured by the loss factor of the second bush 20, and thus the antivibration device 1 can secure the damping force in the low vibration region (low frequency region) (Lf:1).

Next, a relation (load-deflection characteristic curve) between the load and the displacement of the first bush 10 and the second bush 20, and the load-deflection characteristic curve of the antivibration device 1 obtained from the relation will be described with reference to FIG. 6. FIG. 6 is a diagram for showing a relation between the load and the displacement of the first bush 10 and the second bush 20. The horizontal axis represents the displacement in the axial direction of the coupling member 30, and the vertical axis represents the load input to the antivibration device 1. Further, the characteristic curve of the antivibration device 1 is represented by a solid line, the characteristic curve of the first bush 10 is represented by a dashed-dotted line, and the characteristic curve of the second bush 20 is represented by a dashed line. It should be noted that the values (the displacement and the load) shown in FIG. 6 are examples, and thus the present invention is not limited to these values.

When a tensile force in the axial direction (the right direction of FIG. 1) is applied to the first bush 10 of the antivibration device 1 (see FIG. 1) along with the acceleration of the vehicle (not shown), the antivibration base 13 of the first bush 10 is deformed by the pressing force (to the point A of FIG. 6) of the stopper portion 15 while keeping substantially-linear (straight line shape) high dynamic spring characteristics. If the stopper portion 15 has no effect on the antivibration base 13 (from the point A to the point B), the antivibration base 13 is deformed while keeping substantially-linear low dynamic spring characteristics during the movement of the inner attachment portion 12 in the gap 14. When the displacement becomes larger, the first stopper rubber portion 13b abuts on the rubber membrane portion 13e (see FIG. 2) (point B). From the time, high resistance occurs in the deformation of the antivibration base 13, and the characteristic curve steeply rises.

The amount of displacement of the antivibration base 23 of the second bush 20 is set larger than that of the first bush 10 relative to the same input load until the protruding portions 22a abut on the outer attachment portion 21 (to the point C), and the antivibration base 23 is deformed while keeping substantially-linear (straight line shape) low dynamic spring characteristics. The thicknesses in the radial direction of the stopper rubber portions 23a provided at the protruding tip ends of the protruding portions 22a are small. Thus, if the protruding portions 22a abut on the outer attachment portion 21 (point C), the characteristic curve steeply rises. Therefore, the amount of displacement of the antivibration base 23 of the second bush 20 is set smaller than that of the first bush 10 relative to the same input load when the protruding portions 22a abut on the outer attachment portion 21.

The antivibration device 1 with the first bush 10 and the second bush 20 disposed on the both ends in the axial direction (the input direction of the load) of the coupling member 30 is deformed while keeping the substantially-linear characteristics until the load becomes approximately 2000N as shown in FIG. 6. If the load becomes larger, the displacement at the time of inputting a high load is restricted by the first stopper rubber portion 13b of the first bush 10. The antivibration device 1 is set so as to keep substantially-linear dynamic spring characteristics until the input load becomes approximately 2000N, and thus excellent antivibration performance is exercised in a range of loads applied to the antivibration device 1 along with the oscillation of the engine that usually occurs when the vehicle is idling or accelerating, or when the vehicle is running.

Figure 7A:
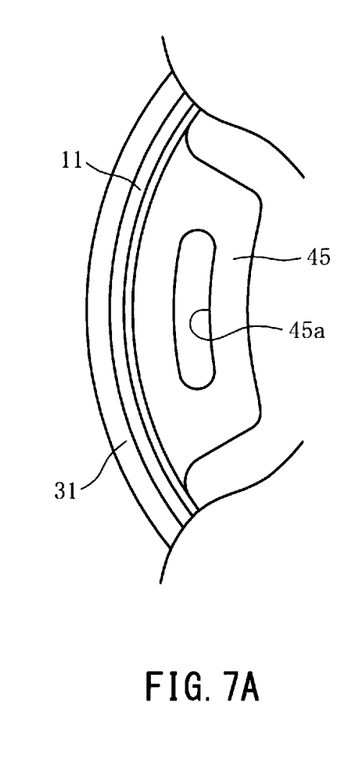
FIG. 7A is a partial plan view for showing another mode of a stopper portion of the first bush.

Next, modification examples of the antivibration device 1 will be described with reference to FIG. 7. The antivibration device 1 can change the amount of pre-compression, hardness (spring constant), and the like of the stopper portion 15 in accordance with the characteristics required. FIG. 7A is a partial plan view for showing another mode of a stopper portion 45 of the first bush 10, FIG. 7B is a partial plan view for showing still another mode of a stopper portion 55 of the first bush 10, and FIG. 7C is a partial plan view for showing still another mode of a stopper portion 65 of the first bush 10.

The stopper portion 45 shown in FIG. 7A is provided with an arc-like bore portion 45a penetrating in the axial direction (the direction orthogonal to the paper of FIG. 7A) along the circumferential direction of the outer attachment portion 11. Thereby, the spring constant of the stopper portion 45 can be decreased, and the pressing force of the inner attachment portion 12 (see FIG. 1) can be decreased.

Figure 7B:
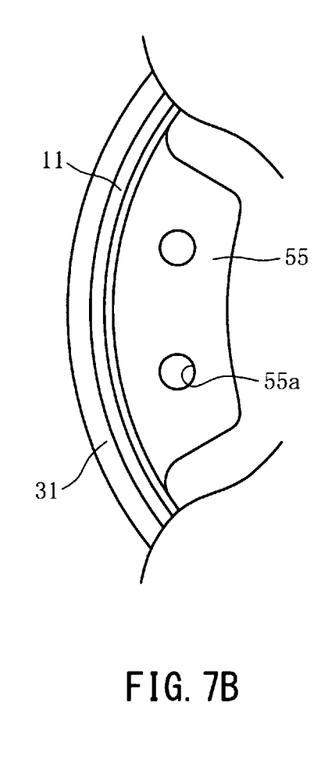
FIG. 7B is a partial plan view for showing still another mode of the stopper portion of the first bush.
Figure 7C:
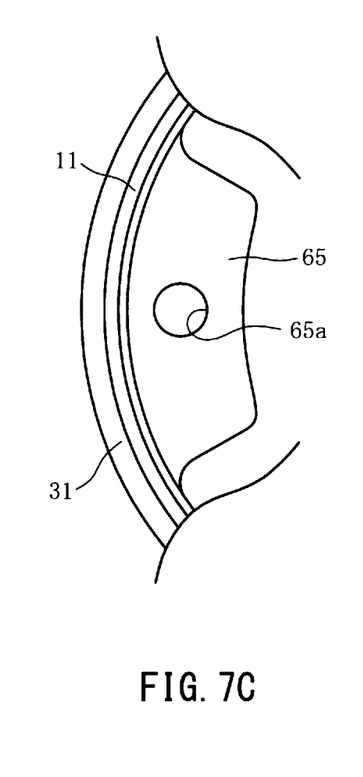
FIG. 7C is a partial plan view for showing still another mode of the stopper portion of the first bush.

The stopper portion 55 shown in FIG. 7B is provided with two bore portions 55a penetrating in the axial direction (the direction orthogonal to the paper of FIG. 7B). The stopper portion 65 shown in FIG. 7C is provided with a bore portion 65a penetrating in the axial direction (the direction orthogonal to the paper of FIG. 7C). The bore portions 55a and 65a are formed in the stopper portions 55 and 65, so that the spring constant can be decreased, and the pressing force of the inner attachment portion 12 (see FIG. 1) can be reduced.

Figure 8A:
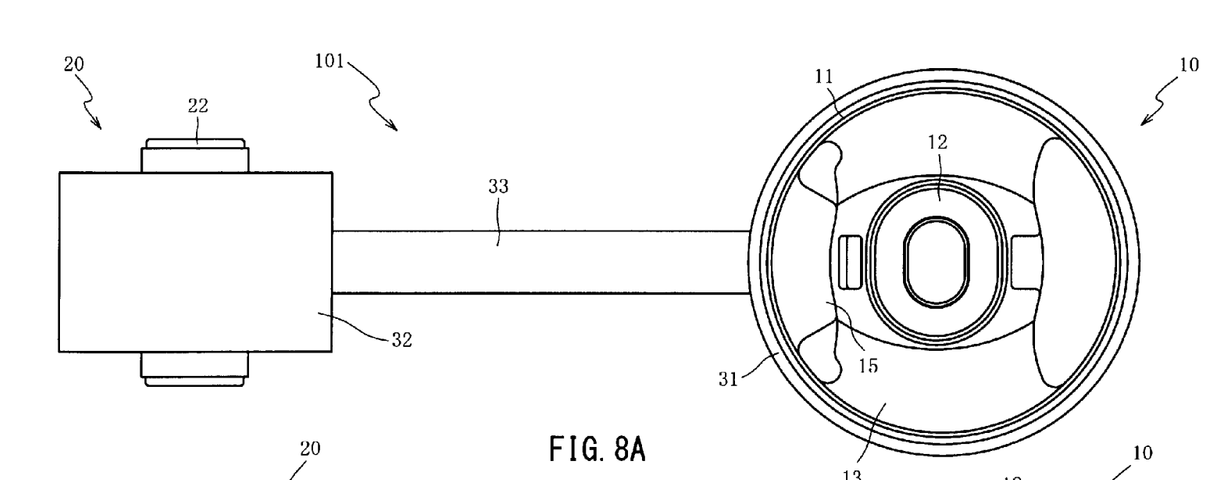
FIG. 8A is a plan view of an antivibration device in a second embodiment.
Figure 8B:
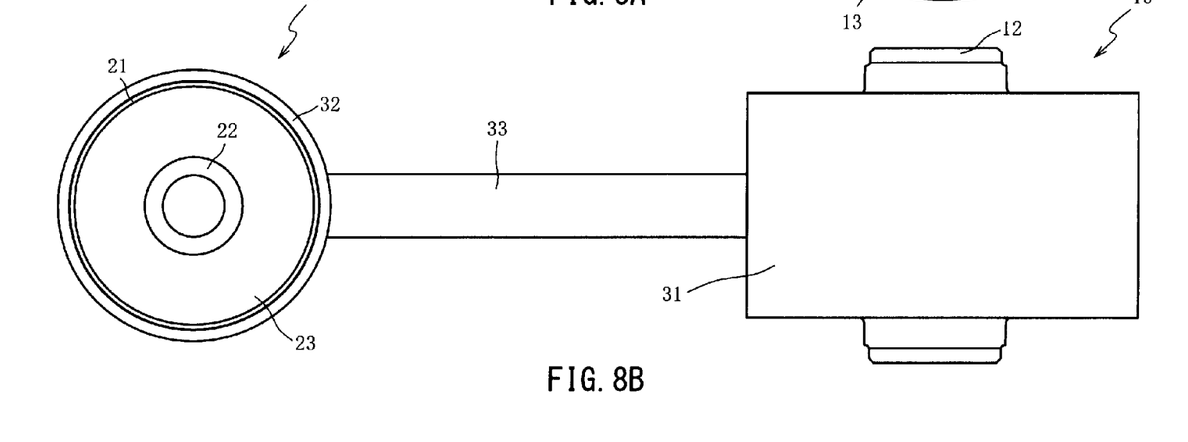
FIG. 8B is a side view of the antivibration device.

Next, a second embodiment will be described with reference to FIG. 8. In the first embodiment, there has been described a case where the first bush 10 and the second bush 20 are fixed to the coupling member 30 so that the axial directions thereof are in parallel with each other. On the contrary, in the second embodiment, there will be described a case where the first bush 10 and the second bush 20 are fixed while the axial directions thereof are orthogonal to each other. FIG. 8A is a plan view of an antivibration device 101 in the second embodiment, and FIG. 8B is a side view of the antivibration device 101.

It should be noted that the antivibration device 101 in the second embodiment is the same as the antivibration device 1 described in the first embodiment except the direction where the first bush 10 and the second bush 20 are fixed. Thus, the same reference numerals are given to the constitutional elements that are the same as those in the first embodiment, and the explanations thereof will not be repeated. The antivibration device 101 in the second embodiment can realize the same effect as that of the antivibration device 1 described in the first embodiment.

Next, a third embodiment will be described with reference to FIG. 9 and FIG. 10. In the first embodiment and the second embodiment, there has been described a case where the first bush 10 is fitted and pressed into the first tubular member 31 of the coupling member 30 formed in a rod shape (pipe structure) to be coupled to the second bush 20. On the contrary, in the third embodiment, there will be described a case where a coupling member 230 is formed using plate brackets 231 and 234 that are vertically divided and a first bush 210 is sandwiched between the plate brackets 231 and 234. It should be noted that the same reference numerals are given to the constitutional elements that are the same as those in the first embodiment, and the explanations thereof will not be repeated.

Figure 9:
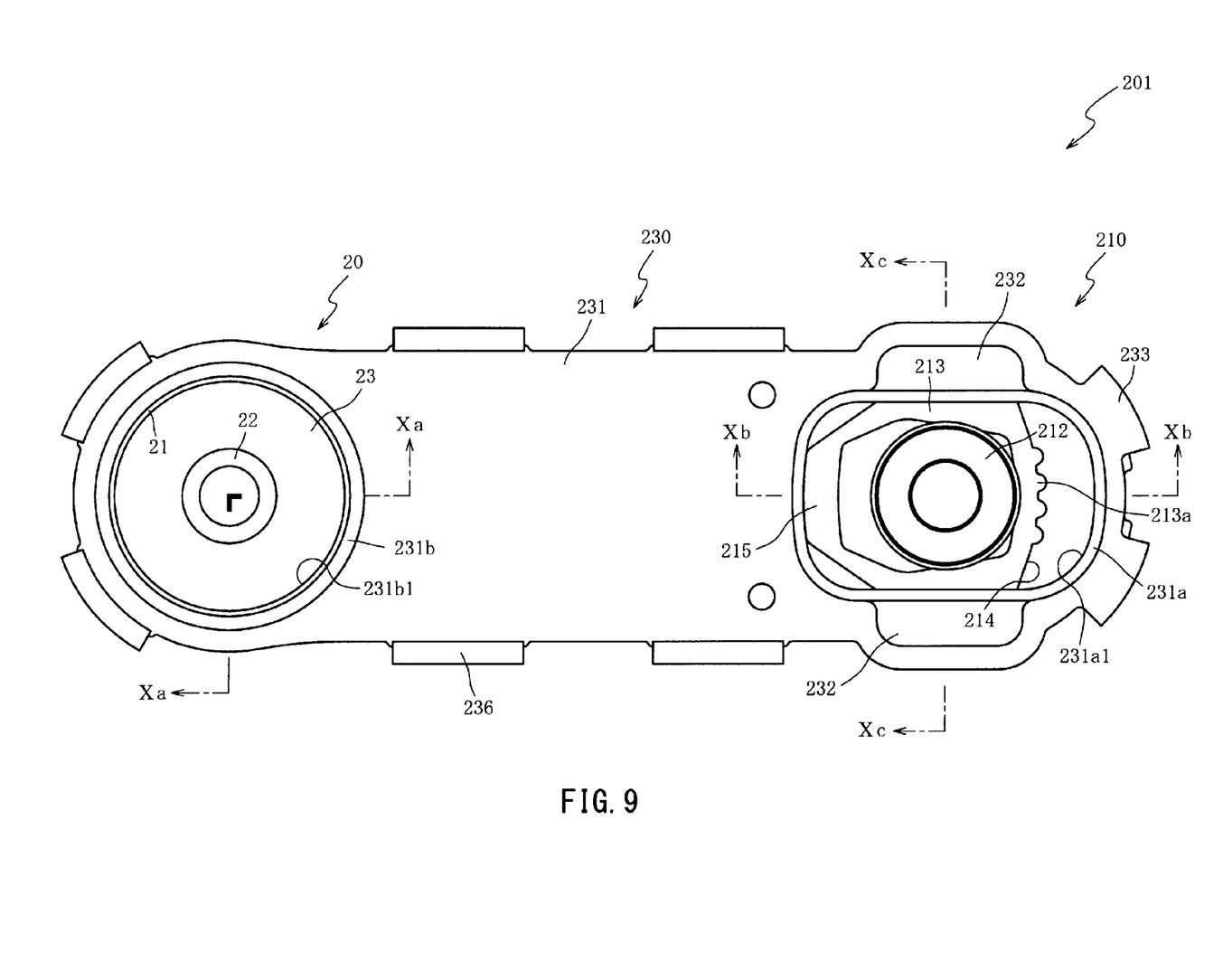
FIG. 9 is a plan view of an antivibration device in a third embodiment.
Figure 10A:
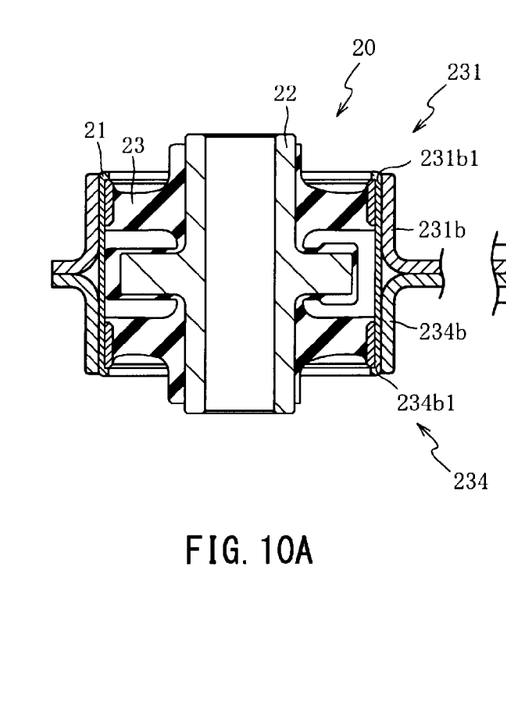
FIG. 10A is a cross-sectional view of the antivibration device taken along the line Xa-Xa of FIG. 9.
Figure 10B:
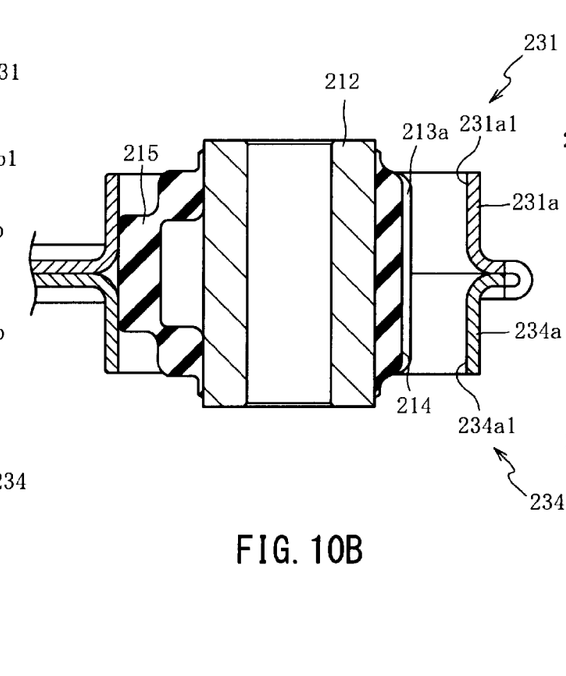
FIG. 10B is a cross-sectional view of the antivibration device taken along the line Xb-Xb of FIG. 9.
Figure 10C:
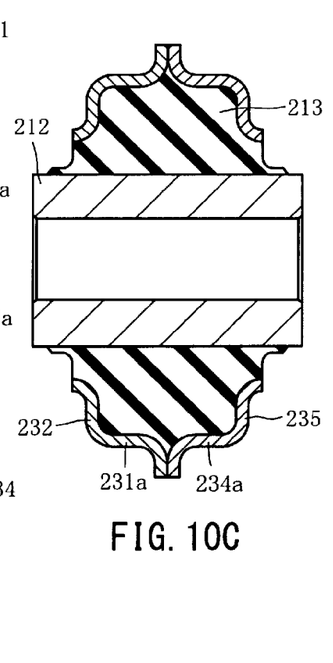
FIG. 10C is a cross-sectional view of the antivibration device taken along the line Xc-Xc of FIG. 9.

FIG. 9 is a plan view of an antivibration device 201 in the third embodiment, FIG. 10A is a cross-sectional view of the antivibration device 201 taken along the line Xa-Xa of FIG. 9, FIG. 10B is a cross-sectional view of the antivibration device 201 taken along the line Xb-Xb of FIG. 9, and FIG. 10C is a cross-sectional view of the antivibration device 201 taken along the line Xc-Xc of FIG. 9.

As shown in FIG. 9, the antivibration device 201 includes the first bush 210, the second bush 20, and the coupling member 230 that couples the first bush 210 and the second bush 20 to each other. In the embodiment, the first bush 210 is coupled to the vehicle body side (not shown), and the second bush 20 is coupled to the engine side (not shown).

The coupling member 230 is of a divided structure in which the plate brackets 231 and 234 (see FIG. 10A and FIG. 10B) that are formed in substantially the same shape in a planar view and that are vertically divided are overlapped with and fixed to each other in the thickness direction. The plate brackets 231 and 234 are of a thin plate structure formed in an oval shape in a planar view, and the both are swaged and fixed by locking pieces 233 and 236 formed at the peripheries.

First opening portions 231a1 and 234a1 (see FIG. 10B) and second opening portions 231b1 and 234b1 (see FIG. 10A) formed in substantially a circular shape are formed at the both ends in the longitudinal direction of the plate brackets 231 and 234, respectively. The first opening portions 231a1 and 234a1 and the second opening portions 231b1 and 234b1 are inner wall portions of rising plate portions 231a, 231b, 234a, and 234b that are formed while being bent in a tubular manner in the opposed directions relative to the horizontal planes of the plate structures configuring the plate brackets 231 and 234. The rising plate portions 231a and 134a are parts to configure the outer attachment portion of the first bush 210, and the second opening portions 231b and 234b are parts into which the second bush 20 (outer attachment portion 21) is fitted and pressed. In the plate brackets 231 and 234, swelling portions 232 and 235 (see FIG. 10C) swelled in the vertical direction (the direction orthogonal to the paper of FIG. 9) are formed at the positions (the vertical direction of FIG. 9) opposed to the first opening portions 231a and 234a.

The first bush 210 includes the rising plate portions 231a and 234a (outer attachment portions) that are formed in a tubular manner as parts of the plate brackets 231 and 234, an inner attachment portion 212 that is located inside the rising plate portions 231a and 234a, and an antivibration base 213 that is provided between the plate brackets 231 and 234 and the inner attachment portion 212 and that is made of elastic material (rubber-like elastic material). The antivibration base 213 is fixed to the outer circumference of the inner attachment portion 212 by vulcanization adhesion, and is pressed and sandwiched between the swelling portions 232 and 235 formed at the plate brackets 231 and 234.

The antivibration base 213 is a part that elastically supports the inner attachment portion 212 for the plate brackets 231 and 234, and is pressed and sandwiched between the swelling portions 232 and 235 formed at the opposed positions orthogonal to the longitudinal direction of the plate brackets 231 and 234. In addition, a first stopper rubber portion 213a is formed therebetween. In the case where the engine is largely displaced in the main direction (the displacement direction of the engine when the vehicle is accelerating and the direction where the inner attachment portion 212 is displaced rightward relative to a plate bracket 231 in FIG. 9), the first stopper rubber portion 213a serves as a stopper while being pressed and sandwiched between the inner attachment portion 212 and the rising plate portions 231a and 234a.

A gap 214 is provided in a concave manner between the first opening portion 231a and the antivibration base 213 pressed and sandwiched between the swelling portions 232 and 235 along the axial direction (the direction orthogonal to the paper of FIG. 9) of the inner attachment portion 212. In the embodiment, the gap 214 is formed to penetrate through the plate brackets 231 and 234 in the thickness direction. The gap 214 is provided at the position (the right side of FIG. 9) where the opening area of the gap 214 becomes narrow when the vehicle is accelerating. A stopper portion 215 is provided inside the rising plate portions 231a and 234a on the side (the left side of FIG. 9) opposite to the gap 214 across the inner attachment portion 212.

The stopper portion 215 is made of elastic material (rubber-like elastic material), and is formed integrally with the antivibration base 213 by vulcanization. The stopper portion 215 presses the inner attachment portion 212 and the rising plate portions 231a and 234a in a state where the stopper portion 215 is preliminarily compressed in the longitudinal direction (the horizontal direction of FIG. 9) of the plate brackets 231 and 234 between the inner attachment portion 212 and the rising plate portions 231a and 234a in the initial state.

In the antivibration device 201 configured as described above, in the case where the load input in the axial direction of the coupling member 230 is a predetermined value or smaller, the dynamic spring constant of the first bush 210 is set larger than that of the second bush 20. In this case, the loss factor of the second bush 20 is set larger than that of the first bush 210. On the other hand, in the case where the input load exceeds the predetermined value, the dynamic spring constant of the first bush 210 is set smaller than that of the second bush 20. The settings as described above can realize the low dynamic spring characteristics in a high vibration region while the damping force in a low vibration region is secured as similar to the first embodiment.

Further, the antivibration base 213 is pressed and sandwiched between the swelling portions 232 and 235 of the plate brackets 231 and 234, and the stopper portion 215 that is formed integrally with the antivibration base 213 is pressed into the rising plate portions 231a and 234a that are formed integrally with the plate brackets 231 and 241, so that the stopper portion 215 is preliminarily compressed. Therefore, the first bush 210 can be simply configured.

The present invention has been described above on the basis of the embodiments. It is easy to guess that the present invention is not limited to the above-described embodiments at all, and can be variously modified and changed without departing from the scope of the present invention. For example, it is obvious that the values and shapes (for example, the number, dimensions, shapes of constitutional elements and the like) described in the embodiments are examples, and the other values and shapes can be employed.

Further, each embodiment may be changed in such a manner that a part or multiple configurations provided in an embodiment are added to another embodiment, or exchanged for those in another embodiment.

In each embodiment, there has been described a structure in which the antivibration base in the initial state serves as a high dynamic spring by preliminarily compressing the stopper portions 15 and 215, and the pressing force by the stopper portions 15 and 215 is decreased to serve as a low dynamic spring by the load input in the axial direction of the coupling members 30 and 230 in the first bushes 10 and 210. However, it is obvious that the present invention is not limited to this structure, but another structure may be employed. As another structure, for example, it is conceivable that a member that is buckled by the load input in the axial direction of the coupling members 30 and 230 and that is restored when no load is applied is provided at a part of the antivibration base. Accordingly, the antivibration base is set as a high dynamic spring due to the rigidity of the antivibration base in the initial state, and is set as a low dynamic spring by bending a part of the antivibration base by the load input in the axial direction of the coupling members 30 and 230. Even in the case of such a structure, the effects same as those in each embodiment can be realized.

In the first embodiment, there has been described a case where the first bush 10 is coupled to the engine side and the second bush 20 is coupled to the vehicle body side. However, it is obvious that the present invention is not limited to this, but the constitutional elements can be inversely disposed unlike the embodiment. Specifically, even in the case where the second bush 20 is coupled to members (members on the power unit side such as an engine, a motor, a convertor housing, and a transmission) disposed on the engine side through a member for fastening and fixing such as an independent bracket, the effects same as those in the embodiments can be realized.

In each embodiment, there has been described a case where the gaps 14 and 214 formed in the first bushes 10 and 210 are formed to penetrate in the axial direction of the first bushes 10 and 210, respectively. However, the gaps 14 and 214 do not necessarily penetrate in the axial direction, but may be formed at a part in the axial direction in a hollow manner. Since, in this case, too, the antivibration bases 13 and 213 can be easily elastically deformed by the gaps, and the relative positions of the inner attachment portions 12 and 212 and the outer attachment portions (coupling members 30 and 230) can be changed.

In each embodiment, there has been described a case where the antivibration bases 13 and 213 of the first bushes 10 and 210 adhere to the inner attachment portions 12 and 212 by vulcanization, respectively. However, the present invention is not necessarily limited to this. It is obvious that these techniques are applied to the antivibration devices in which the antivibration bases 13 and 213 are held by the inner attachment portions 12 and 212 in a noncontact manner.

The invention claimed is:

1. An antivibration device comprising:
a first bush;
a second bush; and
a coupling member that couples the first bush and the second bush to each other,
wherein each of the first bush and the second bush has an inner attachment portion that is attached to a member on a vehicle, an outer attachment portion coupled to the coupling member, and an antivibration base made of rubber-like elastic material that is provided between an outer circumferential side of the inner attachment portion and an inner circumferential side of the outer attachment portion,
wherein the inner attachment portion of the first bush has a convex portion protruding from an intermediate position of the inner attachment portion of the first bush,
wherein the antivibration base of the first bush includes a stopper portion attached to the inner circumferential side of the outer attachment portion,
wherein the antivibration base of the second bush includes a hollow portion, a protruding portion that protrudes from the outer circumferential side of the inner attachment portion into the hollow portion, and a viscous fluid that is enclosed in the hollow portion and that is agitated by the protruding portion to generate resistance due to relative displacement between the inner attachment portion and the outer attachment portion of the second bush,
wherein when a load input in an axial direction of the coupling member is a predetermined value or smaller, the stopper portion of the first bush has a preliminary compression pressing on the outer circumferential side of the convex portion of the inner attachment portion of the first bush in the axial direction of the coupling member away from the coupling member and the protruding portion of the second bush remains in the hollow portion thereby creating a dynamic spring constant of the first bush that is larger than that of the second bush, and a loss factor of the second bush that is larger than that of the first bush, and wherein when the load input in the axial direction of the coupling member exceeds the predetermined value, the stopper portion of the first bush is released from pressing on the convex portion of the inner attachment portion of the first bush in the axial direction of the coupling member and the protruding portion of the second bush is pressed against the inner circumferential side of the outer attachment portion of the second bush in the axial direction of the coupling member towards the coupling member thereby creating the dynamic spring constant of the first bush that is smaller than that of the second bush.

2. The antivibration device according to claim 1, wherein the first bush includes a gap that is provided at the antivibration base in a concave manner along an axial direction of the inner attachment portion and that is provided in the direction in which the inner attachment portion and the outer attachment portion relatively come close to each other due to the load input in the axial direction of the coupling member, and the stopper portion is provided on the side opposite to the gap across the inner attachment portion and that is made of elastic material.

3. The antivibration device according to claim 1, wherein the stopper portion of the first bush is disposed adjacent a position where the coupling member couples to the outer attachment portion of the first bush, and wherein when the load input in the axial direction of the coupling member exceeds the predetermined value, the inner attachment portion of the first bush is shifted away from the position where the coupling member couples to the outer attachment portion of the first bush and is separated from the stopper portion by a gap.

4. An antivibration device comprising:

a first bush;

a second bush; and a coupling member that couples the first bush and the second bush to each other, wherein each of the first bush and the second bush has an inner attachment portion that is attached to a member on a vehicle, an outer attachment portion coupled to the coupling member, and an antivibration base made of rubber-like elastic material that is provided between an outer circumferential side of the inner attachment portion and an inner circumferential side of the outer attachment portion, wherein the inner attachment portion of the first bush has a convex portion protruding from an intermediate position of the inner attachment portion of the first bush, wherein the antivibration base of the first bush includes a stopper portion attached to the inner circumferential side of the outer attachment portion, and wherein the first bush includes a gap that is provided at the antivibration base in a concave manner along an axial direction of the inner attachment portion and that is provided in the direction in which the inner attachment portion and the outer attachment portion relatively come close to each other due to the load input in the axial direction of the coupling member, wherein the second bush includes a hollow portion that is formed at the antivibration base, a protruding portion that protrudes from the outer circumferential side of the inner attachment portion into the hollow portion, and a viscous fluid that is enclosed in the hollow portion and that is agitated by the protruding portion to generate resistance due to relative displacement between the inner attachment portion and the outer attachment portion of the second bush, wherein when a load input in an axial direction of the coupling member is a predetermined value or smaller, the stopper portion of the first bush has a preliminary compression pressing on the outer circumferential side of the convex portion of the inner attachment portion of the first bush in the axial direction of the coupling member away from the coupling member and the protruding portion of the second bush remains in the hollow portion thereby creating a dynamic spring constant of the first bush that is larger than that of the second bush, and a loss factor of the second bush that is larger than that of the first bush, and wherein when the load input in the axial direction of the coupling member exceeds the predetermined value, the stopper portion of the first bush is released from pressing on the convex portion of the inner attachment portion of the first bush in the axial direction of the coupling member and the protruding portion of the second bush is pressed against the inner circumferential side of the outer attachment portion of the second bush in the axial direction of the coupling member towards the coupling member thereby creating the dynamic spring constant of the first bush that is smaller than that of the second bush.

5. The antivibration device according to claim 4, wherein the stopper portion of the first bush is disposed adjacent a position where the coupling member couples to the outer attachment portion of the first bush, and wherein when the load input in the axial direction of the coupling member exceeds the predetermined value, the inner attachment portion of the first bush is shifted away from the position where the coupling member couples to the outer attachment portion of the first bush and is separated from the stopper portion by a gap.

* * * * *